United States Patent
Dueck et al.

[11] Patent Number: 5,913,199
[45] Date of Patent: Jun. 15, 1999

[54] PROCESS AND SYSTEM FOR AUTOMATIC, COMPUTER-SYSTEM-SUPPORTED OPTIMISATION

[75] Inventors: Gunter Dueck, Waldhilsbach; Jochen Eddelbüttel, Hamburg; Martin Gerhardt, Bammental; Christof Pospiech, Heidelberg; Hans-Georg Reusch, Wiesenbach; Tobias Scheuer, Heidelberg; Klaus Volk, Höchst; Hans-Martin Wallmeier, Leimen, all of Germany

[73] Assignee: International Business Machines Corp., Armonk, N.Y.

[21] Appl. No.: 08/765,478
[22] PCT Filed: May 23, 1995
[86] PCT No.: PCT/EP95/01961
§ 371 Date: Dec. 20, 1996
§ 102(e) Date: Dec. 20, 1996
[87] PCT Pub. No.: WO96/02040
PCT Pub. Date: Jan. 25, 1996

[30] Foreign Application Priority Data
Jul. 11, 1994 [DE] Germany ............... 44 24 037

[51] Int. Cl.⁶ .................................. G06F 17/60
[52] U.S. Cl. ............................ 705/7; 705/8
[58] Field of Search .............. 705/7, 8; 364/149, 364/151, 152, 157

[56] References Cited

U.S. PATENT DOCUMENTS

| | | | |
|---|---|---|---|
| 4,983,898 | 1/1991 | Kanda | 318/561 |
| 5,196,997 | 3/1993 | Kurtzberg et al. | 364/152 |
| 5,325,292 | 6/1994 | Crockett | 705/10 |

Primary Examiner—Allen R. MacDonald
Assistant Examiner—Hani. M. Kazimi
Attorney, Agent, or Firm—Scully, Scott, Murphy & Presser; Stephen C. Kaufman, Esq.

[57] ABSTRACT

In a process and a system for automatic, computer-system-supported optimization and the search for a state x dependent on at least one parameter P, for which f(x) as a measure of the quality of x assumes an extremum, an initial solution, i.e. a state x, is found as an initial state and a further state y different from x is found by means of an elementary change in an individual parameter P from x. If the result of a comparison of the target function values f(x) and f(y) is that f(y) is poorer than f(x) by more than a threshold value T, y is rejected, x is retained and a fresh adjacent state of x is found. If f(y) is at least as great as f(x)–T, there is a transition to state y. The threshold T is successively reduced to zero.

17 Claims, 3 Drawing Sheets

PROCESS AND SYSTEM FOR AUTOMATIC, COMPUTER-SYSTEM-SUPPORTED OPTIMISATION

FIELD OF THE INVENTION

The invention relates to a process and a system for automatic, computer-system-supported optimisation in accordance with the preambles to Claims 1 and 15.

BACKGROUND OF THE INVENTION

In many technical areas there are difficult optimisation problems, which can only be solved to a very limited extent by an automated technical—mathematical computer treatment. Thus, traditional optimisation systems are often already pushed to their limits in the interpretation of simple telephone, power, water distribution or remote heating networks and deliver inadequate results. Similar problems arise in the numerical control of machine tools, in laying out electronic circuits on one integrated computer chip as well as in drawing up plans for optimal loading of machines—or fleets of vehicles. Particularly complex problems were thus often handled only with intuition and experience, but not with the aid of computers.

Classic processes for the solution—even though it might be of only limited usefulness—of more complex optimisation problems (where "solution" for any problem is to be understood as the solvable "solution" to that problem, but not the "optimal" solution) make use of iterative processes with local change searches. Thus, for example, there is an iterative solution to the problem of finding the shortest connecting route through a given number of places, often of course generally solutions, which are about 10% from the optimum. However, 10% in the case of complex and economically significant optimisation problems like chip placement is a deviation which is fundamentally no longer acceptable.

Different optimization methods in accordance with the state of the art are found in the following articles, which are incorporated herein in their entirety by reference:
a) W. Domschke, "Logistik: Rundreisen und Touren", Munich, Vienna, Oldenbourg, 3rd edition (199);
b) Bachem et al., "Simulated Trading—Eine kurze Einführung", 3. Workshop Parallele Systeme und Algorithmen, Bonn 1./2. April 1993, pp.81–87;
c) Dueck et al., "Threshold Accepting; A General Purpose Optimization Algorithm Appearing superior to Simulated Annealing", Journal of Comp. Physics, Vol. 9, pp. 161–165, 199;
d) M. Bargl "Akzeptanz und Effizienz computergestützter Dispositionssysteme in der Transportwirtschaft", Verlag "Peter Lang".

According to DUECK et al., optimisation problems with a technical background can be formulated in mathematical language as follows: Given a number X of states x (or "solutions"). Since the states have a kind of geometric mutual relationship—one can describe two very similar ones as narrowly adjacent, two very different ones as remote –, X is also called a space of states. In this space a real value target function f is defined. That is to say: For each state x from the space X a real number f (x) can be calculated, which should represent a measure of the quality of x: for example f (x) can be the length of a tour x or the number of parts in a knapsack with the package x. Optimize means: look for a state x in the space X, for which f (x) is minimal (as in the Travelling Salesman problem) or maximum (as in the knapsack problem). Since minimizing f means the same as maximizing –f, only a theory for maximizing is necessary (cf. also: "Optimieren mit Evolutionsstrategien" by Paul Ablay, Spektrum der Wissenschaft, July 1987, page 14).

It is generally usual, for the solution of scheduling problems, such as the Travelling Salesman problem, to use iterative processes with local change search, where the search for a good solution starts with any solution, for example, a spontaneously selected round tour. An optimizing computer changes this and checks, whether the new solution is better (shorter). If so, the optimizing computer replaces the old tour by the new and checks again: Can it be changed around, so that an even better solution results? If it succeeds in doing so, it continues working with this solution, until the solution found can no longer be improved by changing it locally (local optimum or minimum). Such iteration methods can become very complicated even in local extrema, without getting sufficiently close to an overall extremum.

A clear improvement over the classical optimizing method results from the processes developed by DUECK et al., "Threshold Accepting (TA)" and "flood". This is an optimizing method, which relates to an iteration which also permits worsened states, within the framework of a tolerance threshold T.

If T is large, almost all solutions are allowed, regardless of whether they improve the instant solution or make it worse. During the course of the process, however, T is gradually reduced to ZERO. Thus with large T, the solution is already involved in the region of good solutions and then, through a reduction in T, approaches the overall extremum, that is, the very best solution, ever more rapidly. In the vicinity of the absolute extremum the rule applies more frequently; there a step is often prohibited. The maintenance of ever reducing thresholds drives the solution closer to a very good or optimal solution. If, finally, T=0, the algorithm corresponds to an iteration which will permit of no worsening of the solution. One great advantage of this method resides in the fact that an adequately large initial threshold will prevent the optimisation process from finding itself too early in a poor local extremum.

It is shown in practice, that the Threshold Accepting method delivers astonishingly improved results, even compared with comparatively "modern" processes like "simulated annealing" (cf also Dueck et al.), at clearly minimized calculation costs.

SUMMARY OF THE INVENTION

Certainly the step from the theory to the application of Threshold Accepting in practical problems with several boundary conditions is problematical, particularly in asymmetrical scheduling problems (tour planning etc.). The aim of the invention is to avoid these problems as far as possible.

The invention achieves this goal through the subject matter of Claims 1 and 15.

In summary, an optimization process is achieved with the aid of the invention, that can be readily adapted even to difficult practical problems and provides, mathematical solutions, for example, even on conventional personal computers or workstations, which approach or correspond to an exact solution. A basic idea behind the invention is the application of elementary exchange steps/mutations to determine new solution states for the iteration. These elementary steps represent a minimal change of the state x in the space X. The concept of elementary steps is particularly suitable for Threshold-Accepting processes, but can also be employed in traditional optimization processes such as "simulated annealing" etc. In practice, it is shown that distinct simplifications in the implementation of the system as well as in the calculation can be achieved with the aid of the invention, particularly in the area of tour planning.

Problems in tour planning can be formulated as follows (see also Domschke in this connection): A number of customers, whose needs and locations are known, should be supplied with a number of vehicles of certain capacities from a depot (e.g. a warehouse or the tool holders of a numerically controlled machine tool) with a certain stock (an analogous problem arises in numerically controlled machine tools in automatic machining with several processing heads movable independently of each other). What have to be determined are the excursions and/or movements, which are to be accomplished, while observing certain boundary or associated conditions (e.g. capacity and time restrictions), in order to minimise the transport costs.

Important variations of the tour problem are the collecting problem (e.g. the collection of household or industrial refuse), problems of tour planning for sweeping machines in street cleaning, multi-depot problems (i.e., several depots have to be considered) as well as circulation problems (variable collection and/or delivery locations).

Tour planning problems have essentially been described by the terms depot, tour and route. Definitions of these terms are also found in Domschke, whereby it should be noted, that the semantic content of these ideas is not to be understood as limiting, but that these ideas should stand deputy also for ideas of similar semantic content in analogous technical problem areas—thus, depot in a machine tool for example, can describe a work piece holder or even the coordinate source.

A standard problem in tour planning is to serve n customers from a depot within a time period—e.g. one manday. The locations of the depot and the customers are known. The shortest distances between the customers as well as between the depot and the customers are likewise known. For serving the customers a predetermined number of vehicles is available. Although the application of the Threshold Accepting method with the application of 2-opt exchange steps (for the definition of 2-opt steps see DUECK et al.) already provides results of limited utility, these can, however, clearly be further improved with the existing invention. In addition, the application of elementary steps in optimization secures an uncomplicated matching to the various special problems of the particular user (working hours regulations, etc.).

In accordance with a particularly preferred embodiment of the invention, the threshold T is reduced adaptively (see Claim 2). The Threshold Accepting algorithm is, as already mentioned, automatically controlled by the variable parameter of the threshold. Further parameters control the computer time portion of the individual changes with which TA works. The performance of the threshold algorithm in relation to a predetermined optimisation problem depends, to a great extent, on the control values selected. With the aid of the adaption process, these values can be automatically controlled in an uncomplicated manner as a function of the current optimisation problem.

In accordance with a particularly preferred embodiment of the invention, the adaptive reduction of the threshold T is effected by means of statistical measurements, particularly by means of moving averages and/or standard deviations (see Claim 3). In this way, the Threshold Accepting method can be matched particularly simply to various data records to be optimized.

In a further preferred variant of the invention adaptive reduction of the threshold T will effect an automatic weighting so that, in evaluating new states y, changes which have greater effect on the optimisation of the target function, will be preferred (see Claim 4). In this way it is possible to determine in an advantageous manner by one measurement, how much change a particular mutation causes, so that then, if a mutation causes only a small change, the proportion of calculation time given to this mutation is reduced. Let us assume that there are two mutations, where the first causes only small changes compared with the second. In such a situation the second mutation should preferably be inserted at the start of optimisation, while the first is inserted towards the end. This is automatically done by the invention.

Here, it is furthermore advantageous, in effecting adaptive reduction of the threshold, first of all to carry out a chance and/or random walk to determine an initial threshold and to determine mean and standard deviation through the target function (see Claim 5). Various adjustments may be made, depending on the mode. In many applied applications it is, however, advantageous, to start with a type of "random walk" and determine the mean and standard deviation through the target function, as well as to determine the medium absolute change of the target function value. This last-named value, in particular, yields a suitable measure for an adaptive adjustment of the threshold.

In the simplest case, a starting value is determined e.g. from the existing named values for the threshold sequence and reduced without further adaptation in accordance with a formula exponentially dependent on the calculation time the threshold:

$$T = \exp(-t^* \text{initial threshold}).$$

The exponential function in dependence on time and initial threshold value represents an especially simple means for the realization of the threshold reduction in Threshold Accepting. In many cases the results are improved further, however, if an adaptive reduction of the threshold results through an own rule adjustment, where, for example, three basis values are calculated through a linear regression over the last (e.g. 5) values of the moving averages, standard deviations and mean absolute changes of the target function, which serve to guide the adaptation. If the average falls off too far, the threshold should be reduced as slowly as possible. If, on the other hand, the average rises, the threshold can be reduced more rapidly.

Additional special advantages of the variants in accordance with Claims 2 to 5 are the easier adjustability of the Threshold-Accepting method, since the sequence of thresholds is produced and scaled automatically. Furthermore, the scatter of the quality of the individual solutions decreases and the solution qualities become more uniform, so that the Threshold Accepting method and its solutions become more reliable.

Elementary changes are preferably modularly summarised into a suitable problem-oriented mutation (see Claim 8). In this way a suitable mutation can be assembled for each problem.

In accordance with a further especially preferred embodiment of the invention the elementary changes are elementary steps of an asymmetrical scheduling problem (Claim 9). According to Dueck et al., 2-opt steps are preferably used for the solution of symmetrical sequencing problems (e.g. the well-known Travelling Salesman problem), i.e., in the Travelling salesman problem, for example, a state y is determined from a state x by the exchange of the two distances. The symmetry of this sequence problem is to be seen in the fact that the distances a to b and b to a are essentially interchangeable with each other without problem, for there are no boundary conditions, which exclude an exchange or are associated with disadvantages. For asymmetrical sequencing problems—e.g. sequencing problems, in which, proceeding from a central place with several movement devices, target places are to be aimed at under certain boundary conditions—the symmetrical exchange of distances often does not lead to optimal results because of predetermined boundary conditions. In this case an especially clear performance advantage arises through the application of elementary exchange steps/mutations compared with "2-opt" and similar mutations.

Further advantageous embodiments of the process in accordance with the invention can be derived from the sub-claims 9 to 14 and 16.

BRIEF DESCRIPTION OF THE DRAWINGS

The invention is explained below with reference to the drawings using examples. These show.

DETAILED DESCRIPTION OF THE INVENTION

Figure 1A:
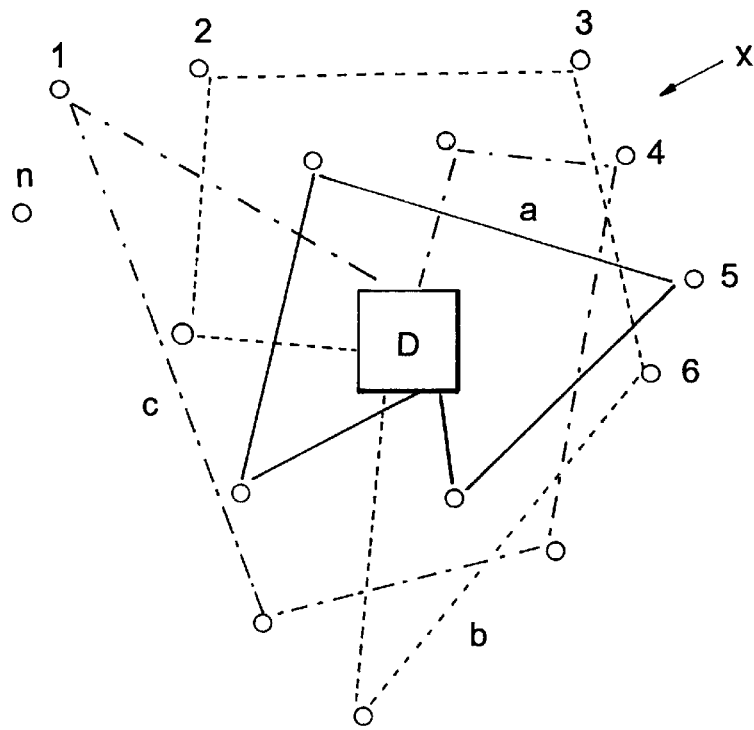
FIGS. 1–2 schematic displays of different solution states of optimisation problems which can be solved using the invention.

FIG. 1 shows an optimisation task with following problem: How can the shortest route between different holes to be drilled be determined for a drilling device with three drilling heads capable of movement independently of each other in the x/y plane. Analogously, there is the question of how freight can be delivered with motor vehicles (to which tours a, b, c are allocated in the drawing) from a depot D to certain customers 1, 2,3, . . . , n (Tour planning problem). The problem of tour planning includes, on one hand, the grouping of tours, i.e., the solution to the problem of which target places and customers should be visited by which vehicle K (clustering—problem). In addition, the sequence in which the customers of a tour are supplied must be determined (routing—problem). The disposition of the freight can be effected as a function of different criteria to accomplish this—usually, however, the disposition of the freight on the vehicles is carried out under the condition that the minimal distance for overall tour plan is achieved. However, it may possibly also be necessary in addition, to consider restrictions such as capacity limits of the vehicles of different vehicle classes, time frame restrictions, delivery from several depots, return freight orders, delayed orders, etc. Furthermore, other optimisation criteria, such as cost aspects and/or a reduction in journey time may, under some circumstances, require to be considered.

Even in the tour problem without additional restrictions the complexity is already so great, that it falls under the class of the NP problems, i.e., the number of the calculation steps required to solve the problem does not increase polynominally, but exponentially as the size of the problem increases. That means that, as a rule, no exact solution of the problem is possible, but heuristic processes must be used, with which an approximation to the "optimal" solution is achieved.

Figure 1B:
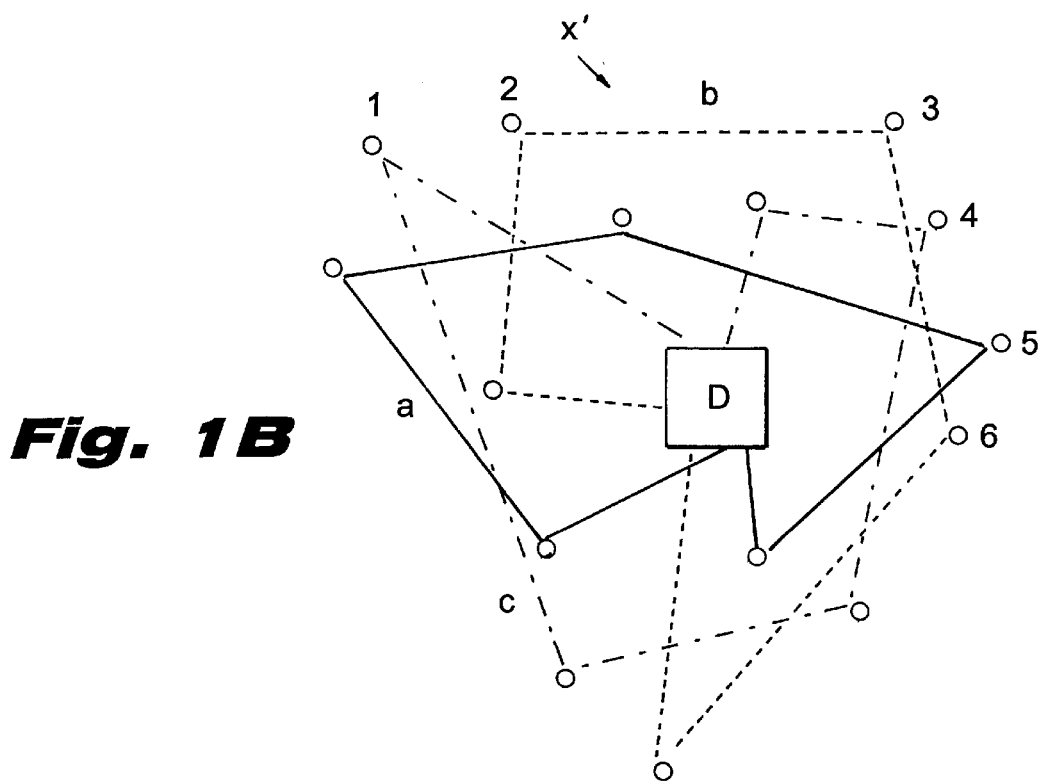
Figure 1C:
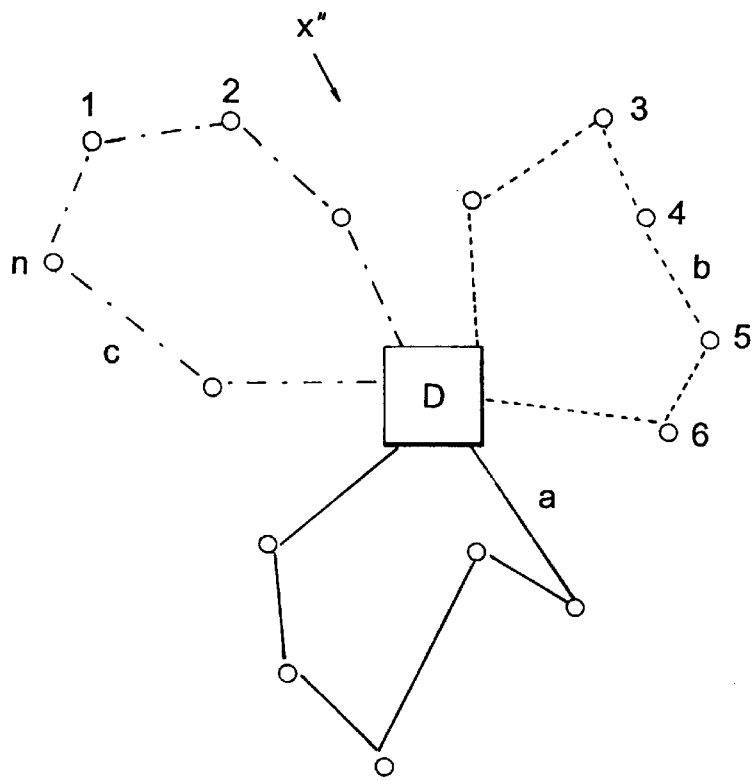

With the invention it is possible, to approach the optimal solution in a short time. FIGS. 1A, 1B and 1C illustrate three states (solutions) x, x' and x" of a tour problem determined with the invention, at which with the help of three movement devices, here vehicles, locations 1,2,3, . . . , n are to be visited (the individual vehicles are allocated tours a, b, c—a: solid line, b: broken line, c: dash-and-dot line). As can be recognized without difficulty, the solutions shown in FIGS. 1A and 1B, are still not optimal, i.e., the distance travelled is still too uneconomical. FIG. 1C already shows an improved solution, since a Threshold Accepting method in accordance with the invention was able with the use of elementary exchange steps (and/or mutations) to determine an intermediate or final solution.

The process in accordance with the invention is carried out automatically and computer-system-supported. To search for a dependent state x dependent on at least one parameter P (orders 1, 2, . . . ,n) for which f (x) as a measure of the quality of x assumes an extremum, a first solution, i.e., a state x (see FIG. 1A) is initially assumed as the starting state. Using an elementary change of a single parameter P, a further state x' different from x is determined from x (see FIG. 1B). If a comparison of the target function values f (x) and f (x') indicates that f(x') is more than one threshold value T worse than f(x), x' is rejected, x retained and a new adjacent state of x determined. If, on the other hand, f (x') is at least as large as f(x)–T, there will be a transition to the state x' and the process will start again. Thus, the threshold T will be gradually exponentially reduced to zero as a function of statistical measurements and starting from an initial threshold value.

In the "solution" shown in FIG. 1A the problem emerges, that the order n is not served. Such a situation and/or irregularity in supply attracts a penalty.

In the embodiment of the invention shown in FIG. 1, an "insertion" and/or "removal" (of orders) is used as an elementary exchange step—thus, an order, "n" was inserted, for example, in FIG. 1B compared with FIG. 1A. An essential difference from mutations like "2-opt" lies in the fact that individual orders can only be removed or inserted (without an "appraisal" of the individual order, as proposed by Bachem et al., falsifying the result), but cannot be exchanged with one another.

The openness of this attempt, which makes possible simple customer and/or problem-oriented adjustments such as a problem-specific cost structure, should be particularly emphasized. In addition, the attempt also makes it possible to transform branch-specific adjustments, such as return freight orders.

In a tour planning problem (not shown) the problem, in contrast to FIG. 1, is extended by a delivery from a place n to a place m. In accordance with the invention, building on the basic tour method, as used in FIG. 1, the delivery orders are divided into a loading and an unloading part. After that these part orders are distributed on three vehicles (tours a, b, c) and the target places arranged for each vehicle with the additional restriction, that loading and unloading part for each tour must be in the correct sequence. An optimal selection of the vehicles and an optimal arrangement of the order components is thus determined, that successive rearrangements are undertaken, which lead to an improvement, or at most to a minor deterioration in the potential saving. The acceptance of slight deteriorations should protect the iterative process from being driven in the wrong direction in an early phase; in the course of the iteration this acceptance is lowered and ultimately reduced to zero.

Figure 2A:
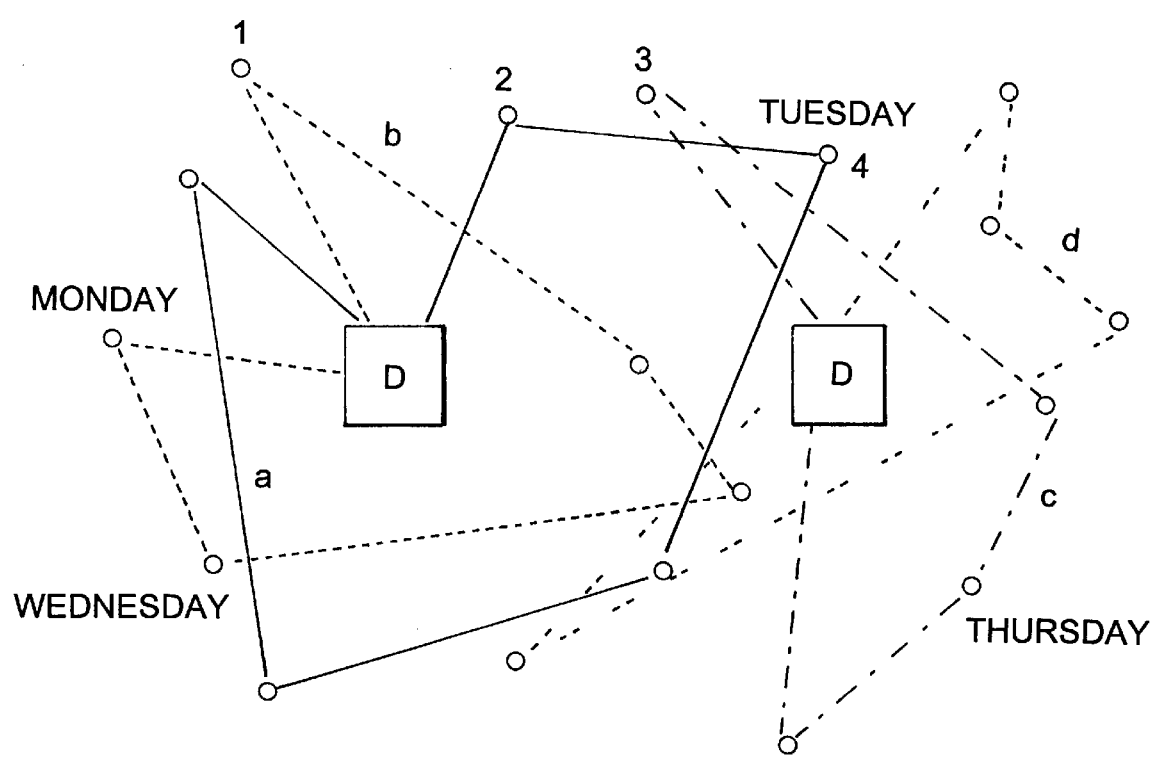
Figure 2B:
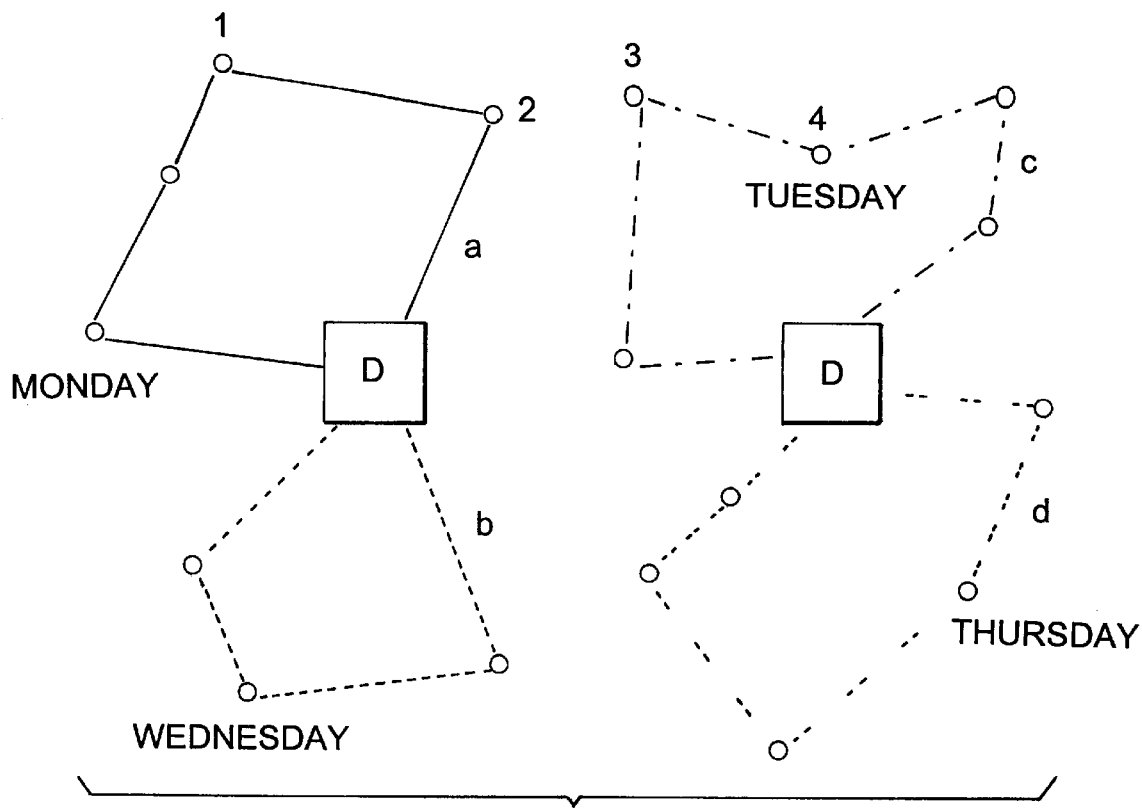

FIG. 2 shows in an analogous way to FIG. 1 the problem of a multi-frequency planning method. For the multi-frequency method, components which describe a regular supply with different frequencies, are integrated into the target function in accordance with a variant of the invention.

Irregularities in the supply are considered as a penalty. Also in this variant of the invention, new states are determined using (sometimes combined) elementary changes where, in contrast to constructive methods it is really possible for the first time, also to incorporate sub-conditions, such as delivery only on certain dates, as sub-conditions of an individual evaluation function. The minimum of the evaluation function is given, with an exact observance of supply frequency, supply times and journey time limits, with a minimal combination of kilometers, costs and journey times.

Figure 3:
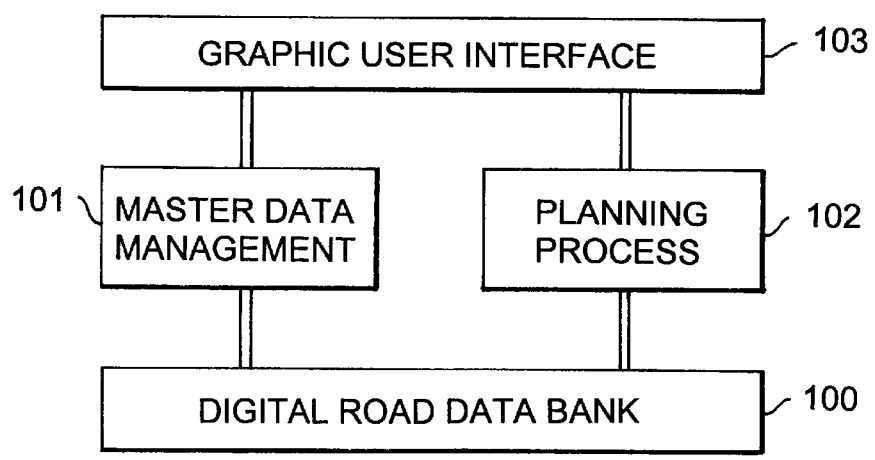
FIG. 3 a schematic part display of an example of one embodiment of the invention.

FIG. 3 illustrates schematically the basic components of an optimisation system in accordance with the invention for tour planning (tour planning module), which comprises a digital route data base 100, with which a master data processing unit 101 and planning method device 102 are connected, with which a graphic interface 103 is also connected for interactive operation. The vectorised roadmap data base allows a precise planning in respect of journey time and distance.

The graphics interface 130 advantageously includes several windows, for instance a roadmap window, in which calculated tours can be displayed, an entry window, particularly with a scroll-bar operation as well as graphics and/or non-graphics windows for displaying the loading of the individual trucks, as well as further parameters (not illustrated).

We claim:

1. A computer implemented method for automatic optimization of tour planning, said process comprising steps of:
   accepting multiple option parameters relating to said tour planning;
   seeking a state X dependent on at least one parameter P, for which f(x) as a measure of the quality of x assumes an extremum;
   performing process steps for controlling a multi-parameter movement system, with following cycle of steps:
   a) a first solution, where a state x as initial state, is first determined,
   b) a second state y, different from x, is determined, wherein, the state y is determined by means of at least one elementary change of a single parameter P from x,
   c) the target function values f(x) and f(y) are compared, particularly in such a way that,
      c1) if f(y) is worse than f(x) by more than a threshold value T, y is rejected, x is retained and a new adjacent state of x is determined, and
      c2) if f(y) is at least as large as f(x)−T, and hence f(y) is at most worse than f(x) by T, the state y is adopted, and
      c3) the threshold T is successively reduced to zero;
   planning a tour based on a result of said multi-parameter movement system presented to a tour operator via output display means; and
   passing said result to an independent process for further processing.

2. A process in accordance with claim 1 wherein the reduction of the threshold T in step c3) is adaptive.

3. A process in accordance with claim 2, wherein the adaptive reduction of the threshold T is by means of statistical measurements, particularly by means of moving averages, standard deviations and/or moving averages of mean absolute changes.

4. A process in accordance with claims 2 or 3, wherein in the adaptive reduction of the threshold T an automatic weighting is carried out in such a way that, in determined the new states y, preference is given to changes which have a larger influence on the optimization of the target function f.

5. A process in accordance with claims 1 or 2 or 3, wherein in the adaptive reduction of the threshold for determining the initial threshold, a random walk is first carried out and mean, standard deviation and average absolute change determined through the target function f.

6. A process in accordance with claim 1, wherein the threshold T is reduced exponentially as a function of the computation time starting with the initial threshold value.

7. A process in accordance with claim 1, wherein a plurality of elementary changes are summarised to a corresponding problem-oriented change in a modular fashion.

8. A process in accordance with claim 1, wherein a plurality of elementary changes are elementary steps of an asymmetric scheduling problem.

9. A process in accordance with claim 1, wherein said elementary change, is an "insertion" and/or "removal" of orders used in a route-optimizing problem of a numerically-controlled machine tool movement or a multi-parameter tour planning system.

10. A process in accordance with claim 1, wherein a plurality of places (1,2,3, . . . ,n) are visited by several movement devices (a, b, c, d), particularly vehicles.

11. A process in accordance with claim 10, wherein time and distance restrictions, are taken into account when evaluating the merit of f(x), restrictions.

12. A process in accordance with claim 10, wherein successive transpositions of orders (1,2,3, . . . n) are carried out for optimization of tour planning system.

13. A process in accordance with claim 10, wherein components which describe a regular delivery at different frequencies are integrated into the solution for optimization of tour planning system.

14. A process in accordance with claim 13, wherein irregularities in delivery are subject to a penalty.

15. An optimization of tour planning A system for carrying out the process in accordance with claims 1 or 14, said system comprising:
   first means for determining a first state x,
   a second means for determining an adjacent state y of x by means of elementary changes of the individual parameter P,
   a third means for comparing the target function values f(x) and f(y), which are designed in such a way that, if f(y) is worse than f(x) by more than a threshold value T, y is discarded, x is retained and a new adjacent state of x is determined and, if f(y) is at least as large as f(x)−T, and hence if f(y) is not worse than f(x) by more than T, there is a transition to state y, said system further comprising a means for the successive reduction of T to zero, and
   an output display means for presenting a result of said multi-parameter movement system to a tour operator via output display means and passing said result to an independent process.

16. A system in accordance with claim 15, which further includes a digital route data base (100) to which are attached a master data processing unit (101) and a planning method device (102), which are in turn connected to a graphic user interface (103) for displaying tours and road information.

17. A computer implemented method for automatic optimization of tour planning, said process comprising steps of:
   accepting multiple option parameters relating to said tour planning;

seeking a state x dependent on at least one parameter P, for which f(x) assumes an extremum, said f(x) representing a measure of a quality of x;

performing process steps for controlling a multi-parameter movement system, said multi-parameter movement system comprising steps of:

determining a first solution, said first solution having said state x as an initial state, determining a second state y by means of at least one elementary change of a single parameter P from x, said state y being different from x, comparing target function values f(x) and f(y) where, if f(y) is worse than f(x) by more than a threshold value T, y is rejected, x is retained and a new adjacent state of x is determined, and if f(y) is at least as large as f(x)−T, and hence f(y) is at most worse than f(x) by T, the state y is adopted, and said threshold value T is successively reduced to zero, wherein for said reduction of the threshold value T an automatic weighting is carried out in such a way that in determining new states y preference is given to changes which have a larger influence on the optimization of the target function f;

planning a tour based on a result of said multi-parameter movement system presented to a tour operator via output display means; and passing said result to an independent process for further processing.

* * * * *